United States Patent [19]

Russell et al.

[11] 3,738,456
[45] June 12, 1973

[54] SPEED SENSITIVE SELF-ENERGIZING BRAKE

[75] Inventors: George K. Russell, Castle Rock; Ronald L. Criley, Evergreen; Richard H. Frost, Littleton, all of Colo.

[73] Assignee: Frost Engineering Development Corporation, Englewood, Colo.

[22] Filed: Jan. 5, 1970

[21] Appl. No.: 744

[52] U.S. Cl. ............................................. 188/184
[51] Int. Cl. ............................................ F16d 59/00
[58] Field of Search ...................... 188/184, 185; 242/107.3

[56] References Cited
UNITED STATES PATENTS

| | | | |
|---|---|---|---|
| 1,749,004 | 3/1930 | Strawn | 188/184 |
| 2,139,763 | 12/1938 | Martin | 188/184 |
| 2,174,529 | 10/1939 | Proctor | 188/184 X |
| 2,388,946 | 11/1945 | Beall | 188/184 |
| 3,318,550 | 5/1967 | Quenot | 188/185 X |

Primary Examiner—Duane A. Reger
Attorney—Anderson, Spangler and Wymore

[57] ABSTRACT

This invention relates to a self-energizing brake which is not more than from 50 to 80 percent self-energization actuated and not less than 20 percent otherwise actuated. One or more brake shoes is pivotally attached to a rotating member for movement against a stationary brake drum under the influence of centrifugal force and self-actuation.

15 Claims, 3 Drawing Figures

PATENTED JUN 12 1973 3,738,456

INVENTORS
GEORGE K. RUSSELL
RONALD L. CRILEY
RICHARD H. FROST

Anderson, Spangler Rynn
ATTORNEY

SPEED SENSITIVE SELF-ENERGIZING BRAKE

There are many instances where it is desirable to provide relatively constant velocity braking of a load under conditions of changing acceleration. It is desirable under such circumstances to provide a braking device which will not only provide the necessary braking action, but will decelerate the load at the same rate as it is being accelerated. In dropping or lowering cargo in a gravity acceleration field there is always the problem of the load being accelerated to the point of damage upon impact with the ground at too high a velocity. Since the height from which the drop starts may vary, as for example in unloading cargo from a helicopter over a drop zone, a free fall or a substantially free fall may be injurious to the load.

It is an object of this invention to provide a braking device which will permit the lowering of a load of a predetermined amount at a controlled rate of descent.

It is another object of this invention to provide a lightweight braking device which develops maximum braking efficiency at substantially constant velocity.

Further and other objects will become apparent from the description of the accompanying drawings in which like numerals refer to like parts.

Figure 1:
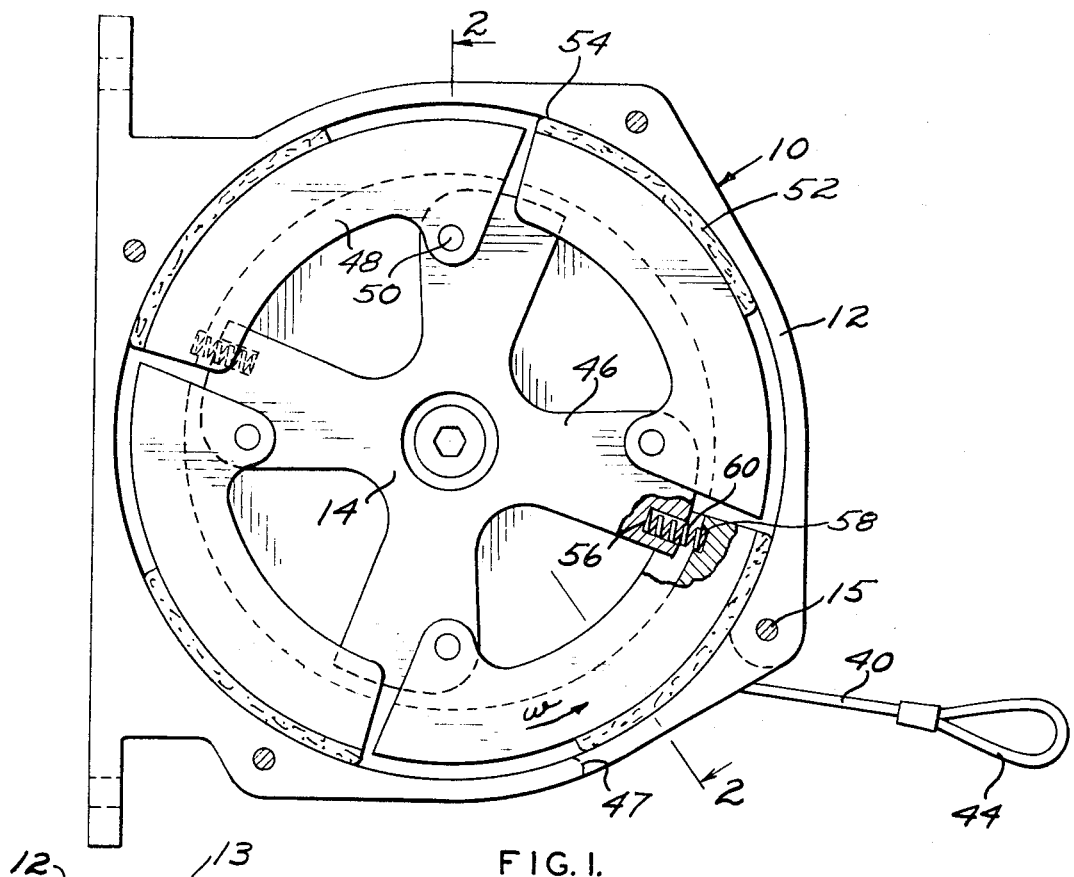
FIG. 1 is an elevational view partly in section and partly broken away of a braking arrangement according to the present invention.
Figure 2:
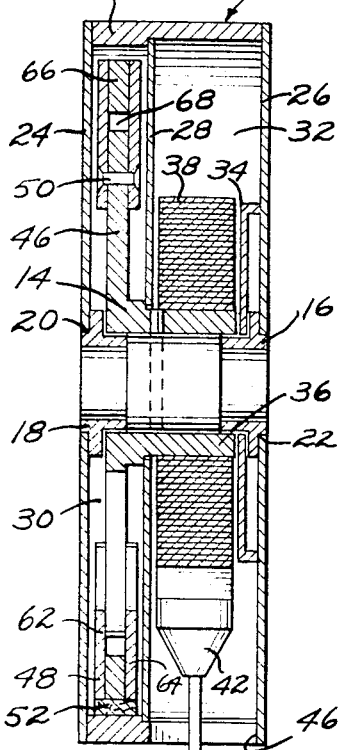
FIG. 2 is a view along line 2-2 of FIG. 1.

Referring now to FIGS. 1 and 2, it is seen that the braking device is broadly designated by reference numeral 10. The brake drum 12 therefore is in the form of a hollow cylindrical ring 13 and is mounted so it is stationary with respect to the hub 14. Within the brake drum 12 there is mounted for rotation a rotating member 14 whose rate of rotation is to be controlled. Rotating member 14 is supported for rotation by a pair of flanged bearings 16 and 18 which in turn are supported in a pair of openings 20 and 22 in side plates 24 and 26 attached to either side of the brake drum 12 by means of bolts 15 and the like. Brake drum 12 is provided with an inner partition wall 28 dividing the space between the side walls into a brake compartment 30 and an actuation compartment 32.

The rotating member 14 has a portion positioned in the brake compartment 30 and another portion extending into the actuation compartment 32. The rotating member 14 portion extends through the actuation compartment. A radially extending flange 34 is attached to side wall 26 by suitable means and provides one side of a spool 36 with the stationary wall 28 providing the other side of the spool. The spool is shown as having a length of flat ribbon 38 spooled thereon and fastened to the rotating member by suitable means. The free end of the ribbon is shown as being attached to a cable 40 by a suitable fastening means 42. The end of the cable may be provided with a loop 44 for attachment purposes and is seen to pass through an opening 47 in a portion of the width of ring 13 to communicate with compartment 32. When a load is placed on cable 40, the rotating member 14 is caused to rotate. It will be appreciated that the rotating member may be connected in a suitable manner to any rotating shaft or other member which is to be braked.

The rotating member is provided with one or more radially extending fingers 46 extending outwardly therefrom within the brake compartment 30. Each of the fingers has a brake shoe 48 pivotally connected to the outer extremity as by means of a pivot pin 50. The brake of the invention as shown in FIG. 1 is a unidirectional brake which will be actuated to brake the rotation of rotating member 14 in a counterclockwise rotation. The brake shoes 48 are seen to be pivoted at the end thereof remote from the direction of travel such that the brake lining 52 during rotation of rotating element 14 precedes the pivot point. The brake shoes 48 are conveniently of a length such that the leading edge 54 of the shoes extends to and is positioned in radially spaced relation to the preceding finger 46. One or more of the fingers is provided with a radially extending bottomed bore 56 opening in opposed relation to the end of a brake shoe 48. The end of the brake shoe is provided with a shallow radially extending bottomed bore 58 opening in opposed relation to bore 56. A spring 60 is positioned within bores 56 and 58 and serves to lightly urge brake lining 52 into engagement with brake drum 12.

From FIG. 2 it will be seen that brake shoes 48 are made up of two side plates 62 and 64 pivotally attached to fingers 46 by means of pivot pin 50. An arcuate member 66 is sandwiched between side plates 62 and 64 and is secured thereto in a suitable manner as by welding and the like. The radial dimension of member 66 is les than the radial dimension of the side plates and the position of the outer radial extremities thereof are coextensive. This provides a slot 68 between the inner extremities of side plates 62 and 64. The brake shoes 48 are of such length that the leading edges of the side plates pass to either side of the next preceding finger 46. This provides a degree of side-to-side stability of the brake shoe during hard braking.

Figure 3:
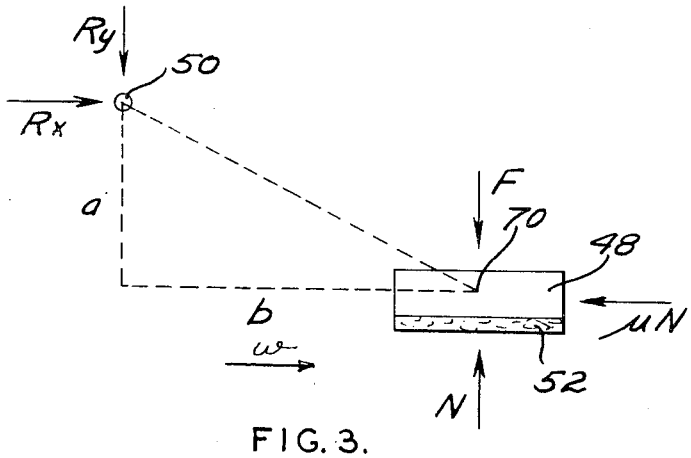
FIG. 3 is a force diagram showing the relationship of forces acting on the brake shoes of the arrangement of FIG. 1.

Referring now to the force diagram of FIG. 3, there is shown diagrammatically the pivot pin 50 and a portion of the brake shoe 48 with brake lining 52. The point 70 represents the center of gravity of the brake shoe 48. Assuming a frictionless pivot, the moments about the pivot point 50 are as follows:

$$Fb - Nb + \mu Na = 0 \quad (1)$$

Where:
$F$ = centrifugal force
$N$ = normal force
$\mu$ = coefficient of friction
$a, b$ = lengths of moment arms
$Rx, Ry$ = pivot pin reaction forces
$w$ = rotational speed
$r$ = contact radius now, solving for the centrifugal force F, $$F = N(b - \mu a)/b = N[1 - \mu(a/b)] \quad (2)$$

When the cable 40 is moved outwardly to cause the rotatable member 14 to rotate, the pin attachment of the brake shoes thereto causes the shoes to rotate and in response to the developed centrifugal force, the brake lining is forced against the brake drum. Thus, braking torque is developed which is a function of payout velocity of the cable 40 as it affects the rotational speed of member 14. The feature which is novel is the self-energizing characteristic of the brake arrangement. From equation 2 it is seen that when the expression $\mu(a/b) = 1$ then $F = 0$ and the brake shoes cease to rotate with respect to the brake drum and becomes a unidirectional clutch. It has been found that when the expression $\mu(a/b) = 0.70$ to $0.80$, when the brake system is from 70 to 80 percent self-energizing and provides a minimum weight package. the self-energization factor may be reduced to as low as 50 percent provided a brake shoe weight increase of about three fold can be tolerated although a range of 70 to 80 percent is to be preferred. If the self-energization factor exceeds 80 percent, such things as temperature, humidity, variations in friction characteristics of the brake lining and-/or the drum braking surface, and the like have too great an effect on the braking action, causing inconsistency of performance between like units. A factor less than 70 percent either provides reduced braking or requires too great a rotational speed or brake shoe weight in order to develop sufficient centrifugal force for desired braking action. Where the factor is maintained between 0.70 and 0.80 the deceleration rate of the brake is very nominal due to its low rotating inertia. The payoff rate need only be that representative of a payoff generated by a 1g load to initiate full braking action. Thus, the onset of braking is quite gentle and avoids the application of abrupt braking force to the load.

It will be appreciated that the use of the flat ribbon 38 has several unobvious advantages over the use of wire rope. It is possible to achieve maximum packing density and thus accommodate greater lengths using the ribbon. Further, since the unwinding provides a uniform reduction in the radius of the wound coil, it is possible to provide for a predetermined reduction in the payoff velocity of the ribbon as the point of connection thereof to the hub is approached.

What is claimed is:

1. A speed sensitive self-energizing brake which comprises: a housing including a pair of sides plates fastened in fixed spaced parallel relation; a rotating member journalled for rotation within the housing about a transverse axis extending normal to the side plates; a hollow cylindrical member held between the side plates; and, at least one brake shoe pivotally attached adjacent one end thereof to said rotating member for rotational movement therewith, bias means biasing the free end of said brake shoe into engagement with the inner surface of the hollow cylindrical member to provide not less than about 20 percent of the braking system, said brake shoe including an arcuate section carrying a brake lining positioned and adapted to engage the inner surface of the hollow cylindrical member in a manner such that not more than about 50 percent to 80 percent of the braking action is a result of self-energization.

2. The brake of claim 1 wherein said rotating member includes a hub with at least one radially extending finger and the brake shoe is pivotally attached thereto adjacent the trailing edge of said arcuate section as it is rotated.

3. The brake of claim 1 wherein the product of the coefficient of friction of the brake lining and the ratio of the length of the normal moment arm to the length of the tangential moment arm for the brake shoe is from about 0.70 to 0.80.

4. The brake of claim 2 wherein the product of the coefficient of friction of the brake lining and the ratio of the length of the normal moment arm to the length of the tangential moment arm for the brake shoe is from about 0.70 to 0.80.

5. The brake of claim 1 wherein the rotating member includes a hub with at least two radially extending fingers and a brake shoe pivotally attached to each finger adjacent the trailing edge of the arcuate section as it is rotated and the product of the coefficient of friction of the brake lining and the ratio of the lengths of the normal and tangential moment arms of the brake shoe is from about 0.70 to 0.80.

6. The brake of claim 5 wherein each arcuate section of the brake shoe is of a length such that the leading edge thereof overlaps a portion of the finger next preceding the finger to which it is pivotally attached.

7. The brake of claim 6 wherein the arcuate section of the brake is provided with a radially extending slot therein adapted to receive and receiving a portion of the next preceding finger therein.

8. A speed sensitive self-energizing brake which comprises: a housing including a pair of side plates fatened in fixed spaced parallel relation, reel forming means journalled for rotation within the housing about a transverse axis extending normal to the side plates, said means including a hub and a disc-like flange mounted in said housing intermediate said side plates so as to divide the housing into a tape compartment and a brake compartment; a hollow cylindrical member held between the side plates enclosing the tape and brake compartments in coaxial relation with the reel forming means, said member including an opening communicating the interior of the tape compartment; a flexible tape wound upon that portion of the hub within the tape compartment with the inner end thereof fastened thereto and the outer end emerging onto the exterior of the housing through the opening in the hollow cylindrical member; and, at least one brake shoe pivotally attached adjacent one end thereof to that portion of the hub within the brake compartment for rotational movement therewith bias means biasing the free end of said brake shoe into engagement with the inner surface of the hollow cylindrical member to provide not less than about 20% of the braking action, said brake shoe including an arcuate section carrying a brake lining positioned and adapted to engage the inner surface of the hollow cylindrical member within the brake comparemtn in a manner such that not more than about 50% to 80% of the braking action is a result of self-energization so as to retard the feel forming means upon rotation thereof in a direction to unwind the tape.

9. The brake of claim 8 wherein said rotating member includes a hub with at least one raidally extending finger and the brake shoe is pivotally attached thereto adjacent the trailing edte of said arcuate section as it is rotated.

10. The brake of claim 8 wherein the product of the coefficient of friction of the brake lining and the ratio of the length of the normal moment arm to the length of the tangential moment arm for the brake shoe is from about 0.70 to 0.80.

11. The brake of claim 9 wherein the product of the coefficient of friction of the brake lining and the ratio of the length of the normal moment arm to the length of the tangential moment arm for the brake shoe is from about 0.70 to 0.80.

12. The brake of claim 8 wherein the rotating member includes a hub with at least two radially extending fingers and a brake shoe pivotally attached to each finger adjacent the trailing edge of the arcuate section as it is rotated and the product of the coefficient of friction of the brake lining and the ratio of the lengths of the normal and tangential moment arms of the brake shoe is from about 0.70 to 0.80.

13. The brake of calim 12 wherein each arcuate section of the brake shoe is of a length such that the leading edge thereof overlaps a portion of the finger next preceding the finger to which it is pivotally attached.

14. The brake of claim 2 wherein the biasing means includes spring means carried by the rotating member for rotational movement therewith, said spring means including a portion engaging a brake shoe so as to normally bias the leading edge thereof into sliding engagement against the inner surface of the hollow cylindrical member when said rotating member is at rest and is rotated.

15. The brake of claim 9 wherein the biasing means includes spring means carried by the rotating member for rotational movement therewith, said spring means including a portion engaging a brake shoe so as to normally bias the leading edge thereof into sliding engagement against the inner surface of the hollow cylindrical member when said rotating member is at rest and is rotated.

* * * * *